(12) United States Patent
Mimura

(10) Patent No.: US 11,644,668 B2
(45) Date of Patent: May 9, 2023

(54) LASER SCANNING DEVICE FORMING AIR CHANNEL AND IMAGE FORMING APPARATUS INCLUDING THE SAME

(71) Applicant: KYOCERA Document Solutions Inc., Osaka (JP)

(72) Inventor: Daisuke Mimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 57 days.

(21) Appl. No.: 17/404,592

(22) Filed: Aug. 17, 2021

(65) Prior Publication Data

US 2022/0057629 A1 Feb. 24, 2022

(30) Foreign Application Priority Data

Aug. 24, 2020 (JP) .............................. JP2020-140723

(51) Int. Cl.
*G03G 15/04* (2006.01)
*G02B 26/12* (2006.01)
*G03G 15/043* (2006.01)

(52) U.S. Cl.
CPC ......... *G02B 26/125* (2013.01); *G03G 15/043* (2013.01)

(58) Field of Classification Search
USPC ........................................................ 399/177
See application file for complete search history.

(56) References Cited

U.S. PATENT DOCUMENTS

| 8,791,975 B2 * | 7/2014 | Yamazaki | ............ | G03G 21/206 |
| | | | | 347/259 |
| 2009/0244670 A1 * | 10/2009 | Sato | ......................... | B41J 2/471 |
| | | | | 359/205.1 |

FOREIGN PATENT DOCUMENTS

| EP | 2993511 A1 * | 3/2016 | ............. | G02B 26/12 |
| JP | 2004286819 A * | 10/2004 | ............. | B41J 2/471 |
| JP | 2009198888 A | 9/2009 | | |

* cited by examiner

*Primary Examiner* — Quana Grainger
(74) *Attorney, Agent, or Firm* — Alleman Hall Creasman & Tuttle LLP

(57) ABSTRACT

A laser scanning device includes a polygon mirror, one or more lenses, and a plurality of light shielding plates. The polygon mirror reflects a light beam during rotation of the polygon mirror. The lenses allow the light beam reflected off the polygon mirror to pass through the lenses. The plurality of light shielding plates are arranged at a distance from each other and block an undesirable beam, which is part of the light beam, reflected off at least one of the lenses and heading for an optical device. The plurality of light shielding plates form an air channel that allows an air current generated by the rotation of the polygon mirror to flow through the air channel.

8 Claims, 4 Drawing Sheets

LASER SCANNING DEVICE FORMING AIR CHANNEL AND IMAGE FORMING APPARATUS INCLUDING THE SAME

INCORPORATION BY REFERENCE

This application is based upon and claims the benefit of priority from the corresponding Japanese Patent Application No. 2020-140723 filed on Aug. 24, 2020, the entire contents of which are incorporated herein by reference.

BACKGROUND

The present disclosure relates to a laser scanning device including a polygon mirror that scans a light beam, and relates to an image forming apparatus including the laser scanning device.

An electrophotographic image forming apparatus includes a laser scanning device that scans a light beam over the surface of a photoconductor by reflecting the light beam using a scanning mirror. The light beam is reflected off the scanning mirror and heads for the photoconductor through an fθ lens.

For example, the laser scanning device scans the light beam using a polygon mirror. The polygon mirror reflects the light beam while rotating, and thereby scans the light beam.

SUMMARY

A laser scanning device according to an aspect of the present disclosure is configured to scan a light beam over a surface of one or more photoconductors. The laser scanning device includes a polygon mirror, one or more lenses, and a plurality of light shielding plates. The polygon mirror reflects the light beam during rotation of the polygon mirror. The lenses allow the light beam reflected off the polygon mirror to pass through the lenses. The plurality of light shielding plates are arranged at a distance from each other and block an undesirable beam, which is part of the light beam, reflected off at least one of the lenses and heading for an optical device. The plurality of light shielding plates form an air channel that allows an air current generated by the rotation of the polygon mirror to flow through the air channel.

An image forming apparatus according to another aspect of the present disclosure includes one or more photoconductors, the laser scanning device configured to scan a light beam over a surface of the photoconductors to form an electrostatic latent image on the surface of the photoconductors, a developing device configured to develop the electrostatic latent image on the surface of the photoconductors as a toner image, and a transfer device configured to transfer the toner image on the surface of the photoconductors to a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of a specific embodiment of the present disclosure and should not limit the technical scope of the present disclosure.

[Configuration of Image Forming Apparatus 10]

A laser scanning device 46 according to an embodiment partly constitutes an image forming apparatus 10. The image forming apparatus 10 includes a print device 4 that executes a print process by an electrophotographic method.

The print process is a process of forming images on sheets 9. The sheets 9 are image formation media such as sheets of paper or sheet-like resin members.

Figure 1:
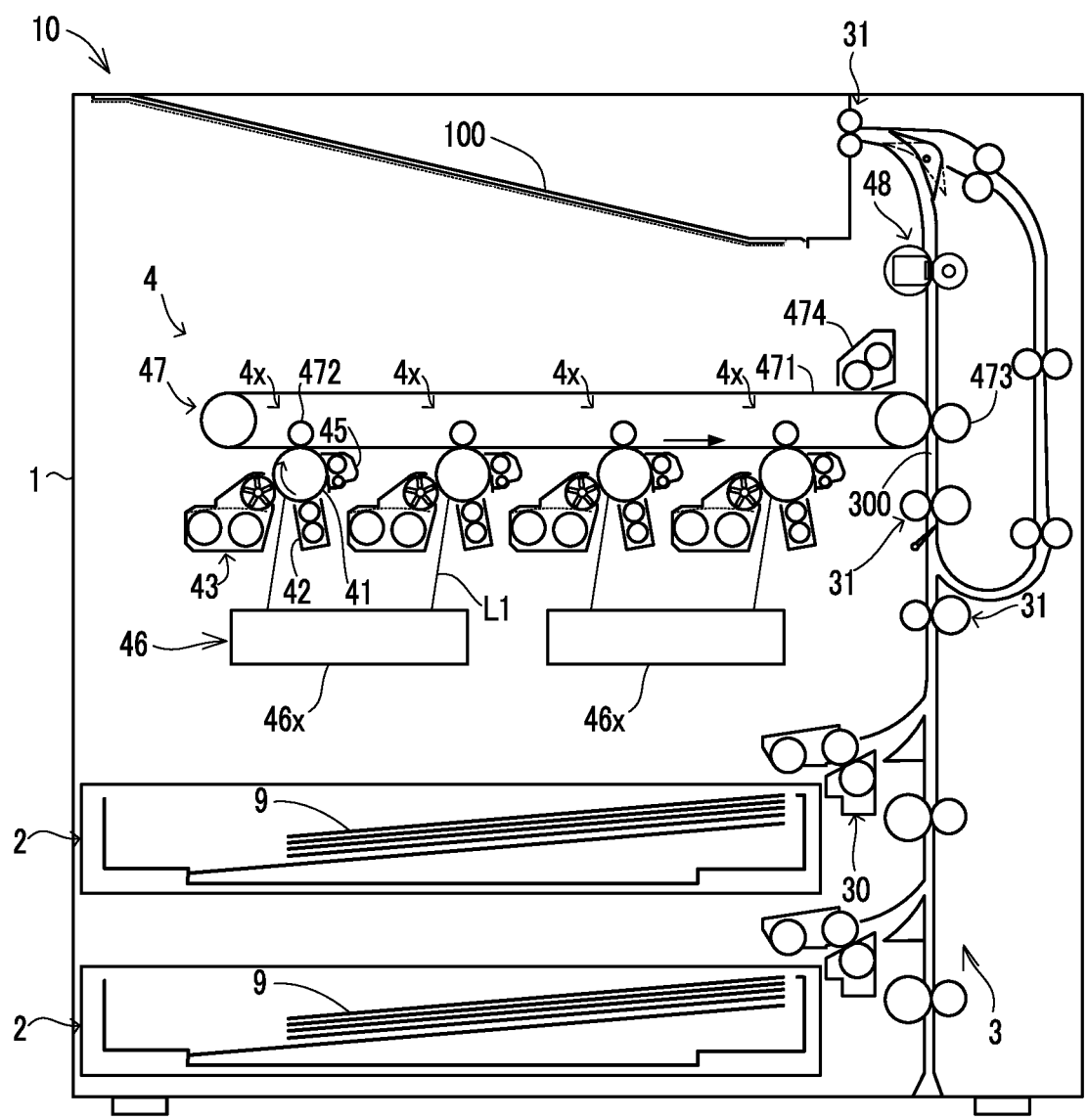
FIG. 1 is a configuration diagram of an image forming apparatus including a laser scanning device according to an embodiment.

As shown in FIG. 1, the image forming apparatus 10 includes sheet storing portions 2, a sheet conveying device 3, and the print device 4. The devices are provided inside a main body 1 of the apparatus. The main body 1 is a main housing that stores the print device 4.

The sheet conveying device 3 includes a sheet feed device 30 and a plurality of conveying roller pairs 31 driven by motors (not shown). The sheet feed device 30 feeds the sheets 9 stored in the sheet storing portions 2 one at a time to a conveyance path 300 inside the main body 1.

The plurality of conveying roller pairs 31 convey the sheet 9 along the conveyance path 300 and then discharge the sheet 9 from the exit of the conveyance path 300 to an output tray 100.

The print device 4 forms an image on the sheet 9 conveyed along the conveyance path 300. The print device 4 includes image forming devices 4x, the laser scanning device 46, a transfer device 47, and a fixing device 48. The image forming devices 4x each include a drum-like photoconductor 41, a charging device 42, a developing device 43, a drum cleaning device 45, and the like.

The image forming apparatus 10 shown in FIG. 1 is a color image forming apparatus of a tandem type. Accordingly, the print device 4 includes four image forming devices 4x that respectively correspond to four colors of toner, wherein the four colors include yellow, cyan, magenta, and black.

Furthermore, the transfer device 47 includes an intermediate transfer belt 471, four first transfer portions 472 that respectively correspond to the four image forming devices 4x, a second transfer portion 473, and a belt cleaning portion 474.

In each of the image forming devices 4x, the photoconductor 41 rotates, and the charging device 42 electrically charges the surface of the photoconductor 41. Furthermore, the laser scanning device 46 scans light beams L1 over the surfaces of the photoconductors 41 to form electrostatic latent images on the surfaces of the photoconductors 41.

Furthermore, the developing devices 43 supply the toner to the surfaces of the respective photoconductors 41 and thereby develop the electrostatic latent images as toner images. The toner is an example of a particulate developer.

The transfer device 47 transfers the toner images to the sheet 9 in the conveyance path 300. Each of the first transfer portions 472 transfers the toner image on the surface of the corresponding photoconductor 41 to the surface of the intermediate transfer belt 471. This forms a color toner image on the surface of the intermediate transfer belt 471.

The second transfer portion 473 transfers the toner image formed on the intermediate transfer belt 471 to the sheet 9 in the conveyance path 300. In this manner, the transfer device 47 transfers the toner images on the surfaces of the photoconductors 41 to the sheet 9.

It is noted that, in a case where the image forming apparatus 10 is a monochrome image forming apparatus, the second transfer portion 473 transfers a toner image on a photoconductor 41 to a sheet 9 in the conveyance path 300.

The drum cleaning devices 45 remove remaining waste toner from the surfaces of the respective photoconductors 41. The belt cleaning portion 474 removes remaining waste toner from the intermediate transfer belt 471.

The fixing device 48 fixes the toner image transferred to the sheet 9 on the sheet 9 by heating and pressurizing the toner image.

In the present embodiment, the laser scanning device 46 includes two scanning units 46x. One of the two scanning units 46x scans the light beams L1 over two of the four photoconductors 41. The other of the two scanning units 46x scans the light beams L1 over the remaining two of the four photoconductors 41.

Figure 2:
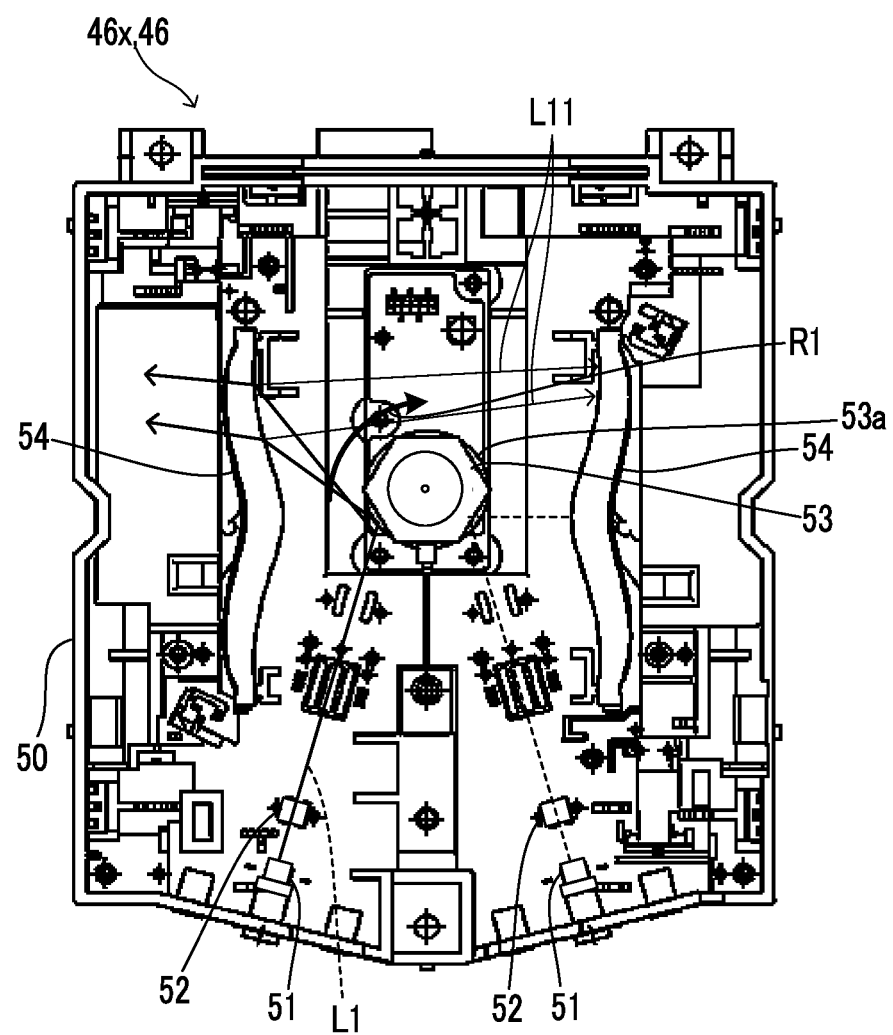
FIG. 2 is a plan view of a main body portion of a scanning unit in the laser scanning device according to the embodiment.

As shown in FIG. 2, each of the scanning units 46x includes a unit housing 50, two light sources 51, two cylindrical lenses 52, one polygon mirror 53, one drive motor 53a, and two fθ lenses 54.

The light sources 51 are laser light sources that emit the light beams L1. The light beams L1 are laser beams. The drive motor 53a rotationally drives the polygon mirror 53. The polygon mirror 53 reflects the light beams L1 while rotating.

The two light sources 51, the two cylindrical lenses 52, the polygon mirror 53, the drive motor 53a, and the two fθ lenses 54 are supported by the unit housing 50. The two light sources 51, the two cylindrical lenses 52, and the two fθ lenses 54 are respectively placed on either side of the polygon mirror 53; that is, one on a first side of the polygon mirror 53, and the other on a second side of the polygon mirror 53.

The light beam L1 emitted from the light source 51 on the first side passes through the cylindrical lens 52 on the first side and reaches the polygon mirror 53. The light beam L1 then reflects off the polygon mirror 53 and passes through the fθ lens 54 on the first side.

The light beam L1 emitted from the light source 51 on the second side passes through the cylindrical lens 52 on the second side and reaches the polygon mirror 53. The light beam L1 then reflects off the polygon mirror 53 and passes through the fθ lens 54 on the second side. The scanning speeds of the light beams L1 passing through the respective fθ lenses 54 and heading for the respective photoconductors 41 are kept constant by the fθ lenses 54.

The light beams L1 that have passed through the respective fθ lenses 54 reflect off two respective mirrors (not shown) and reach the surfaces of the two respective photoconductors 41. In this manner, the single polygon mirror 53 scans the two light beams L1 heading for the surfaces of the two respective photoconductors 41.

Figure 3:
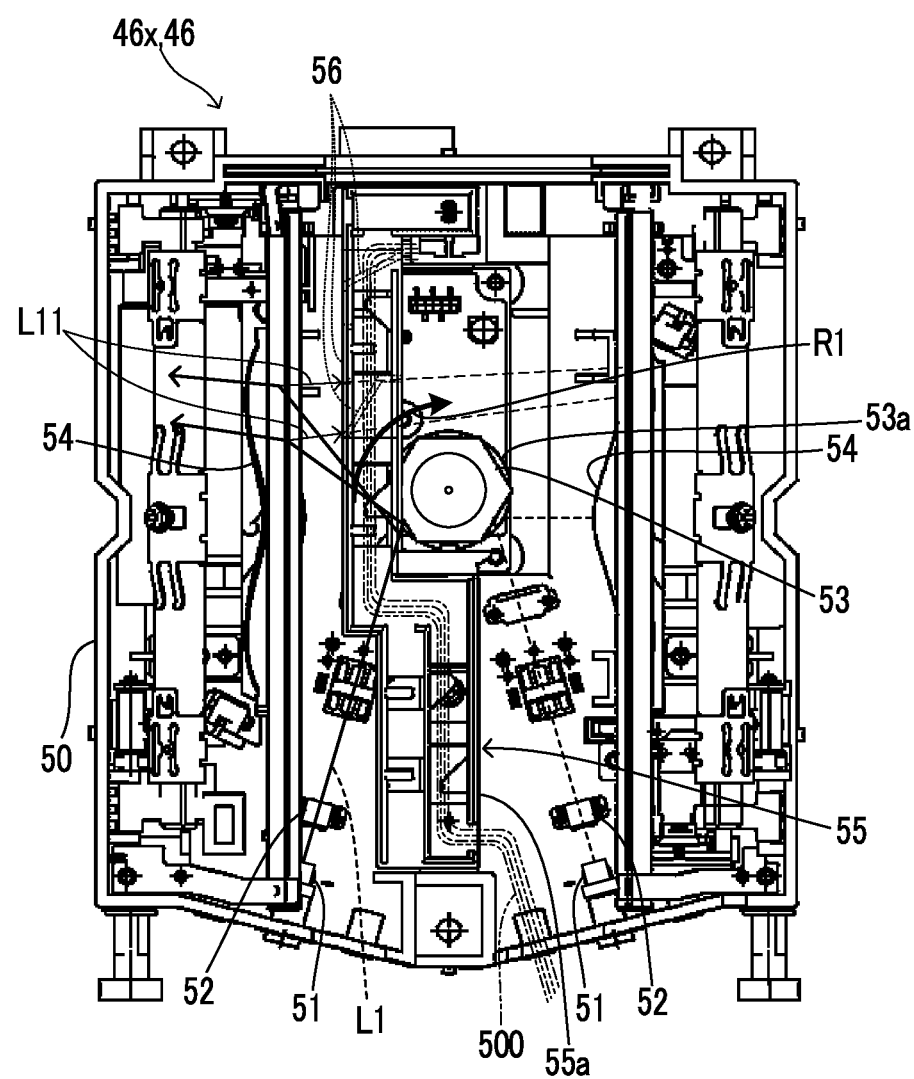
FIG. 3 is a plan view of the scanning unit in the laser scanning device according to the embodiment.
Figure 4:
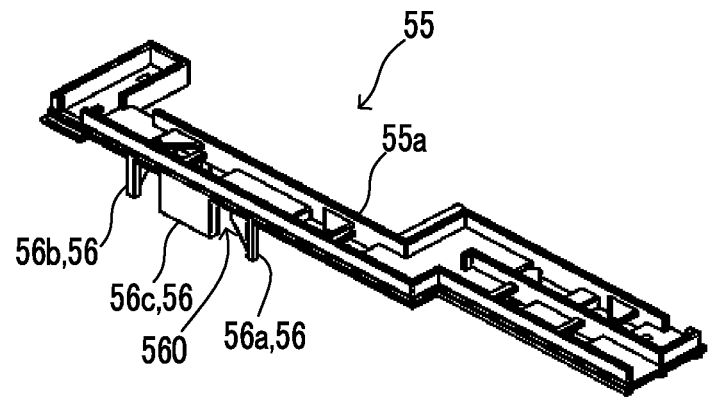
FIG. 4 is a perspective view of a raised member in the laser scanning device according to the embodiment.
Figure 5:
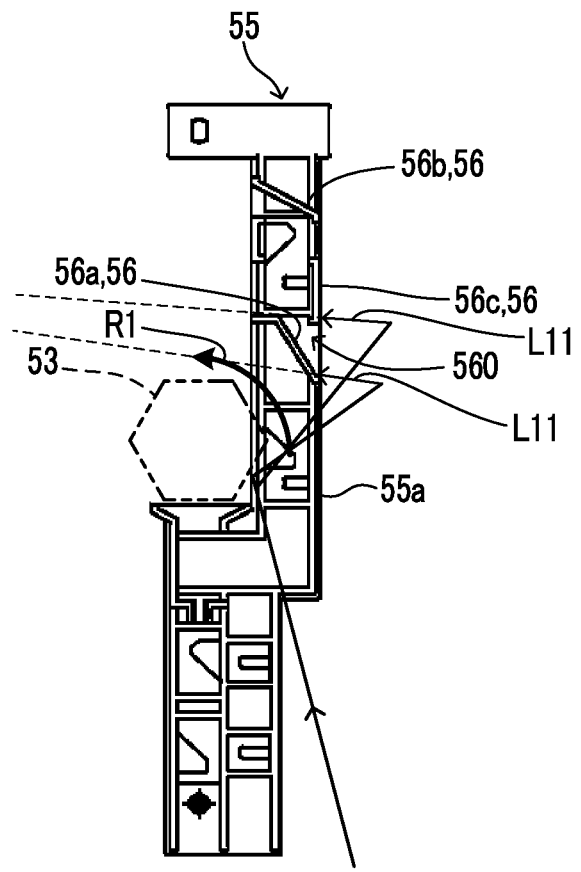
FIG. 5 is a bottom view of the raised member in the laser scanning device according to the embodiment.

Each of the scanning units 46x further includes a raised member 55 installed in the unit housing 50 (see FIGS. 3 to 5). It is noted that FIG. 2 is a plan view of a main body portion of the scanning unit 46x from which the raised member 55 is removed.

The raised member 55 is installed in the unit housing 50 between the two fθ lenses 54. The raised member 55 includes a wire holding portion 55a that holds electric wires 500.

The wire holding portion 55a is formed along a wiring path of the electric wires 500. The electric wires 500 electrically connect a power feed circuit (not shown) provided for the main body 1 of the image forming apparatus 10 to electronic devices, such as the drive motor 53a, included in the laser scanning device 46.

In some cases, the light beams L1 that have reflected off the polygon mirror 53 partially reflect off the surfaces of the respective fθ lenses 54 and become undesirable beams L11 heading for optical devices (see FIGS. 3 and 5). In this case, the undesirable beams L11 may adversely affect the image forming apparatus 10.

For example, in the present embodiment, each of the scanning units 46x of the laser scanning device 46 includes the two fθ lenses 54 placed on either side of the polygon mirror 53, and the polygon mirror 53 scans the light beams L1 over the two respective fθ lenses 54. In this case, undesirable beams L11 reflecting off one of the fθ lenses 54 may head for the other fθ lens 54 and adversely affect the formation of the electrostatic latent image (see FIG. 3).

Accordingly, light shielding members may be placed in the paths of the undesirable beams L11 to block the undesirable beams L11.

On the other hand, each of the scanning units 46x of the laser scanning device 46 includes heat generating bodies including the drive motor 53a that drives the polygon mirror 53. The polygon mirror 53 generates air currents inside the unit housing 50 while rotating, and the air currents act as cooling air that cools the heat generating bodies.

The light shielding members that block the undesirable beams may block the air currents generated by the rotation of the polygon mirror 53 and prevent the air from cooling the heat generating bodies. The laser scanning device 46 is provided with a configuration that solves such problems. The following describes the configuration.

In each of the scanning units 46x of the laser scanning device 46, the raised member 55 includes a plurality of light shielding plates 56 shown in FIGS. 3 to 5. The plurality of light shielding plates 56 are ribs extending downward from the wire holding portion 55a of the raised member 55 to the unit housing 50.

The plurality of light shielding plates 56 are placed in the paths of the undesirable beams L11 between the two fθ lenses 54 such that spaces are left between the plurality of light shielding plates 56. The plurality of light shielding plates 56 block the undesirable beams L11 reflecting off one of the two fθ lenses 54 and heading for the other (see FIGS. 3 and 5). It is noted that one of the two fθ lenses 54 on the left shown in FIG. 5 is an example of the lens that reflects the undesirable beams L11. In addition, it is noted that one of the two fθ lenses 54 on the right shown in FIG. 5 is an example of the optical device that is in the paths of the undesirable beams L11.

The plurality of light shielding plates 56 form an air channel 560 that allows the air currents generated by the rotation of the polygon mirror 53 to flow therethrough (see FIGS. 4 and 5). In the present embodiment, the plurality of light shielding plates 56 include a first light shielding plate 56a, a second light shielding plate 56b, and a third light shielding plate 56c.

The first light shielding plate 56a and the second light shielding plate 56b are arranged to face each other. The first light shielding plate 56a and the second light shielding plate 56b are placed on the periphery of the polygon mirror 53 and are respectively inclined from an upstream side to a downstream side in a rotation direction R1 of the polygon mirror 53 so as to be separated from the polygon mirror 53.

The first light shielding plate 56a and the second light shielding plate 56b form the air channel 560 on the periphery of the polygon mirror 53, and the air channel 560 is inclined from the upstream side to the downstream side in the rotation direction R1 of the polygon mirror 53 so as to be separated from the polygon mirror 53.

The air currents generated by the rotation of the polygon mirror 53 flow from the upstream side to the downstream side in the rotation direction R1 of the polygon mirror 53 so as to be separated from the polygon mirror 53. Accordingly, the air currents generated by the rotation of the polygon mirror 53 smoothly flow along the air channel 560 formed by the plurality of light shielding plates 56.

The third light shielding plate 56c is placed between the first light shielding plate 56a and the second light shielding plate 56b. The third light shielding plate 56c extends in a direction along which the first light shielding plate 56a and the second light shielding plate 56b face each other.

The third light shielding plate 56c blocks the undesirable beams L11 entering the space between the first light shielding plate 56a and the second light shielding plate 56b. In addition, gaps between the first light shielding plate 56a and the third light shielding plate 56c and between the second light shielding plate 56b and the third light shielding plate 56c form the entrance of the air channel 560.

The plurality of light shielding plates 56 maintain the smooth air currents generated by the rotation of the polygon mirror 53 and prevent the undesirable beams L11 reflecting off one of the fθ lenses 54 from entering the other fθ lens 54. That is, the plurality of light shielding plates 56 do not prevent the heat generating bodies, such as the drive motor 53a, from being cooled by the air currents around the polygon mirror 53.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning device configured to scan a light beam over a surface of one or more photoconductors, the laser scanning device comprising:
   a polygon mirror reflecting the light beam during rotation of the polygon mirror;
   one or more lenses allowing the light beam reflected off the polygon mirror to pass through the lenses; and
   a plurality of light shielding plates arranged at a distance from each other and blocking an undesirable beam that is reflected off at least one of the lenses and that heads for an optical device, the undesirable beam being part of the light beam, wherein
   the plurality of light shielding plates include:
      a first light shielding plate and a second light shielding plate arranged to face each other, and
      a third light shielding plate arranged between the first light shielding plate and the second light shielding plate along a direction in which the first light shielding plate and the second light shielding plate face each other;
   the first light shielding plate and the second light shielding plate form an air channel that allows an air current generated by the rotation of the polygon mirror to flow through the air channel; and
   a gap between the first light shielding plate, the second light shielding plate, and the third light shielding plate forms an entrance of the air channel.

2. The laser scanning device according to claim 1, wherein
   the lenses include two fθ lenses, one on each side of the polygon mirror, and
   the plurality of light shielding plates are placed between the two fθ lenses to block the undesirable beam reflected off one of the two fθ lenses and heading for the other.

3. A laser scanning device configured to scan a light beam over a surface of one or more photoconductors, the laser scanning device comprising:
   a polygon mirror reflecting the light beam during rotation of the polygon mirror;
   one or more lenses allowing the light beam reflected off the polygon mirror to pass through the lenses; and
   a plurality of light shielding plates arranged at a distance from each other and blocking an undesirable beam that is reflected off at least one of the lenses and that heads for an optical device, the undesirable beam being part of the light beam, wherein
   the plurality of light shielding plates form an air channel on a periphery of the polygon mirror, the air channel being inclined from an upstream side to a downstream side in a rotation direction of the polygon mirror so as to be separated from the polygon mirror; and
   the air channel allows an air current generated by the rotation of the polygon mirror to flow through the air channel.

4. The laser scanning device according to claim 1, further comprising:
   a unit housing supporting the polygon mirror and the lenses; and
   a raised member installed in the unit housing and including the plurality of light shielding plates and a wire holding portion for holding an electric wire.

5. An image forming apparatus comprising:
   one or more photoconductors;
   the laser scanning device according to claim 1, the laser scanning device being configured to scan a light beam over a surface of the photoconductors to form an electrostatic latent image on the surface of the photoconductors;
   a developing device configured to develop the electrostatic latent image on the surface of the photoconductors as a toner image; and
   a transfer device configured to transfer the toner image on the surface of the photoconductors to a sheet.

6. The laser scanning device according to claim 3, wherein
   the lenses include two fθ lenses, one on each side of the polygon mirror; and the plurality of light shielding plates are placed between the two fθ lenses to block the undesirable beam reflected off one of the two fθ lenses and heading for the other.

7. The laser scanning device according to claim 3, further comprising:
a unit housing supporting the polygon mirror and the lenses; and
a raised member installed in the unit housing and including the plurality of light shielding plates and a wire holding portion for holding an electric wire.

8. An image forming apparatus comprising:
one or more photoconductors;
the laser scanning device according to claim 3, the laser scanning device being configured to scan a light beam over a surface of the photoconductors to form an electrostatic latent image on the surface of the photoconductors;
a developing device configured to develop the electrostatic latent image on the surface of the photoconductors as a toner image; and
a transfer device configured to transfer the toner image on the surface of the photoconductors to a sheet.

\* \* \* \* \*